United States Patent
Matsukata

(10) Patent No.: US 6,692,640 B2
(45) Date of Patent: Feb. 17, 2004

(54) MORDENITE ZEOLITE MEMBRANE AND METHOD FOR PRODUCING THE SAME

(75) Inventor: Masahiko Matsukata, c/o Waseda University 2-7, 6 Chome, Himonya, Meguro-Ku, Tokyo (JP), 152-0003

(73) Assignees: NGK Insulators, Ltd., Nagoya (JP); Masahiko Matsukata, Tokyo (JP)

( * ) Notice: Subject to any disclaimer, the term of this patent is extended or adjusted under 35 U.S.C. 154(b) by 119 days.

(21) Appl. No.: 09/789,441

(22) Filed: Feb. 21, 2001

(65) Prior Publication Data

US 2001/0012505 A1 Aug. 9, 2001

(30) Foreign Application Priority Data

Feb. 28, 2000 (JP) ........................................ 2000-051312

(51) Int. Cl.⁷ ................................................ B01D 39/00
(52) U.S. Cl. ............................ 210/500.25; 210/500.22; 210/509; 264/45.1; 264/45.5; 502/64; 502/78
(58) Field of Search .......................... 210/490, 500.21, 210/500.22, 500.25, 503, 506, 508, 509; 502/4, 64, 20, 71, 78; 264/45.1, 45.5; 95/45, 55; 96/11; B01D 71/02

(56) References Cited

U.S. PATENT DOCUMENTS

| | | | | |
|---|---|---|---|---|
| 5,258,339 A | * | 11/1993 | Ma | ................................ 502/4 |
| 5,429,743 A | | 7/1995 | Geus et al. | |
| 5,871,650 A | * | 2/1999 | Lai | ............................ 210/653 |
| 6,197,427 B1 | * | 3/2001 | Anstett | ........................ 428/426 |

FOREIGN PATENT DOCUMENTS

| | | | | |
|---|---|---|---|---|
| JP | 06157025 A | * | 6/1994 | ........... C01B/33/34 |
| JP | 7-330326 | | 12/1995 | |
| WO | 92/13631 | | 8/1992 | |
| WO | 96/01683 | | 1/1996 | |
| WO | 97/25272 | | 7/1997 | |

OTHER PUBLICATIONS

Database WPI, Week 199427, Derwent Publications Ltd., London, GB; AN 1994–221551, XP002168517 & JP 06 157025 A(NOK Corp.), Jun. 3, 1994.
WO 97 33684 A (Exxon Chemical Patents Inc.) Sep. 18, 1997.
Yamazaki, Satoshi, et al., "Synthesis of a Mordenite Membrane on a Stainless–Steel Filter and Polytetrafluoroethylene Plate Substrates," Microporous Materials, vol. 5, 1995, pp. 245–253.

* cited by examiner

Primary Examiner—W. L. Walker
Assistant Examiner—Krishnan S Menon
(74) Attorney, Agent, or Firm—Burr & Brown

(57) ABSTRACT

A mordenite (MOR) zeolite membrane is formed on a porous substrate and has crystals that are substantially oriented in a specific crystalline direction. A method for producing the mordenite (MOR) zeolite membrane includes the steps of: immersing a porous substrate in a gel of raw materials which contains zeolite constitution elements in molar ratios of 40–400 of $SiO_2/Al_2O_3$, 10–120 of $H_2O/Na_2O$, and 10–40 of $H_2O/SiO_2$; and subjecting the gel in the presence of the porous substrate to hydrothermal synthesis at 150° C. or more to crystallize the MOR zeolite constitution elements and form a MOR zeolite membrane on the porous substrate.

5 Claims, 5 Drawing Sheets

MORDENITE ZEOLITE MEMBRANE AND METHOD FOR PRODUCING THE SAME

BACKGROUND OF THE INVENTION AND RELATED ART STATEMENT

The present invention is directed to an MOR zeolite membrane having mordenite zeolite crystals dominantly oriented in a specific crystalline direction on a porous substrate and a method for producing the membrane. Zeolite has a frame or matrix structure of crystalline aluminosilicate, which includes a mesh-like structure composed of fine pores having a minute and uniform diameter. Thus, zeolite is used as a molecular sieve or a catalyst.

For example, JP-A-7-330326 discloses a zeolite membrane which is formed on a single crystal substrate of an oxide, a semiconductor or a metal, and having crystals oriented in a specific crystalline direction. Zeolite membranes of the A type, Y type and Method for Producing the Same the like are disclosed in the examples in JP '326.

In addition, WO92/13631 discloses zeolite membranes including an oriented single crystal layer of ZSM-5 (MFI), an A type, a Y type, an X type and the like. WO97/25272 discloses an MFI zeolite membrane having crystals oriented along the b-axis and a method for producing the membrane. Further, WO96/01683 discloses an MFI zeolite membrane having crystals oriented along the a-axis and the c-axis and the method for producing the membrane.

However, a mordenite (MOR) zeolite membrane having crystals oriented in a specific crystalline direction has not yet been known. An MOR zeolite membrane is superior in acid resistance in comparison with other zeolite membranes, such as, for example, those of an A type, a Y type and the like. Thus, such an MOR zeolite membrane would be greatly desired and extremely useful in a wide variety of applications.

SUMMARY OF THE INVENTION

The present invention has been made in view of the problems associated with the prior art, and a goal of which is to provide an MOR zeolite membrane having crystals dominantly oriented in a specific crystallization direction and a method for producing the membrane. That is, according to the present invention, there is provided a mordenite (MOR) zeolite membrane formed on a porous substrate and having crystals dominantly oriented in a specific crystalline direction.

According to the present invention, there is further provided a method for producing a mordenite (MOR) zeolite membrane including the steps of:

immersing a porous substrate in a gel of raw material which contains zeolite constitution elements and contains 40–400 of $SiO_2/Al_2O_3$ in molar ratio, 10–120 of $H_2O/Na_2O$ in a molar ratio, and 10–40 of $H_2O/SiO_2$ in molar ratio; and subjecting the gel in the presence of the porous substrate to a hydrothermal synthesis at 150° C. or more to crystallize the zeolite to form a membrane thereof.

In the above, it is preferable that the porous substrate is disposed in a reaction vessel so that a surface on which a membrane is formed becomes perpendicular, and that the gel of the raw material contains $SiO_2/Al_2O_3$ of 100–400 in molar ratio, $H_2O/Na_2O$ of 10–100 in molar ratio, and $H_2O/SiO_2$ of 10–30 in molar ratio.

DETAILED DESCRIPTION OF THE INVENTION

Figure 1A:
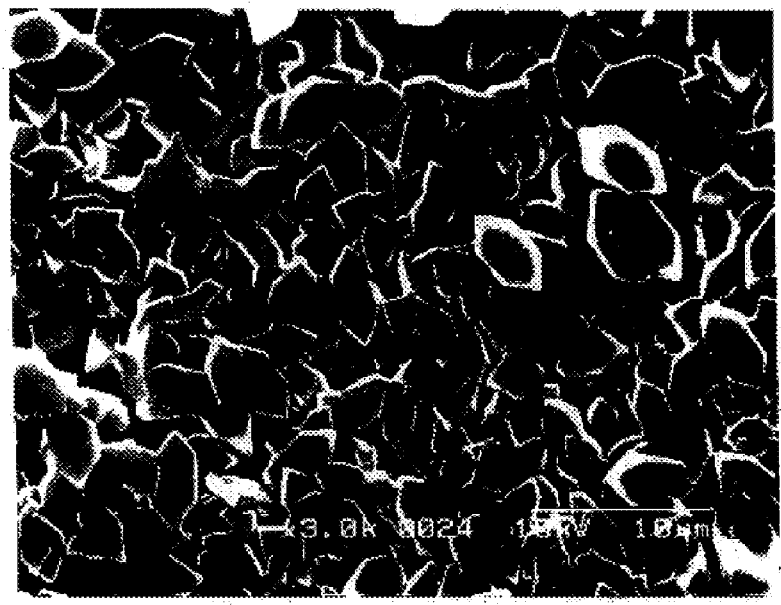
FIG. 1(a) is an SEM photograph showing a crystal structure of a surface of the membrane obtained in Example 1.

The present invention is hereinbelow described in detail.

The present invention is a mordenite (MOR) zeolite membrane dominantly oriented in a specific crystalline direction and formed on a porous substrate.

Such an MOR zeolite membrane can be produced by immersing a porous substrate in a gel of raw material containing zeolite constitution elements having a specific composition and subjecting the gel, in the presence of the porous substrate, to hydrothermal synthesis at 150° C. or more.

In the above MOR zeolite membrane, the crystalline direction is not particularly limited and, it is oriented along any one of the a-axis, b-axis and c-axis. This MOR zeolite membrane has a high ratio of silica and is superior in acid resistance in comparison with an A-type zeolite membrane and a Y-type zeolite membrane, and therefore can be applied for use requiring acid resistance in fields of moleculer sieves and catalysts.

Next, a method for producing the above MOR zeolite membrane is described.

As a raw material, there is used a raw material, such as a sol gel, constituted by a simple substance including silicon, aluminum, and an alkali metal, which are zeolite constitution elements, a compound thereof, and the like.

It is important that the gel of raw material has a composition range of 40–400 of $SiO_2/Al_2O_3$ in molar ratio, 10–120 of $H_2O/Na_2O$ in molar ratio, and 10–40 of $H_2O/SiO_2$ in molar ratio. In the case that a raw material has a composition outside the above range, an MOR zeolite membrane dominantly oriented in a specific crystalline direction may not be obtained. As a composition range of the raw materials, it is more preferable that the molar ratio of $SiO_2/Al_2O_3$ is 100–400, the molar ratio of $H_2O/Na_2O$ is 10–100, and the molar ratio of $H_2O/SiO_2$ is 10–30.

Next, a porous substrate is immersed in the raw-material gel having the above composition range. In the present invention, not a generally-used dense substrate but a porous substrate is employed. A material for a porous substrate is not limited, and various kinds of materials such as ceramics, metals and the like may be used. There is exemplified, as a non-limited example, a substrate made of a ceramic of a general oxide such as alumina, zirconia, titania, silica, or the like; a compound oxide such as silicazirconia, silicatitania, or the like; and a substrate made of a metal such as iron, stainless steel, copper, tantalum, or the like.

Membrane formation by crystallization is performed by subjecting a gel of the raw material for the zeolite to a hydrothermal synthesis reaction and placing a porous substrate having a seed crystal applied thereon in an autoclave.

The important thing here is to perform the hydrothermal synthesis at a temperature of 150° C. or more. If a temperature of hydrothermal synthesis is below 150° C., an MOR zeolite membrane dominantly oriented in a specific crystalline direction may not be produced. Therefore, a hydrothermal synthesis temperature of 150° C. or more is required in order to secure an orientation property. It is more preferable that a temperature for hydrothermal synthesis is within a range of 165–175° C., and it is particularly preferable that the hydrothermal synthesis temperature is around 180° C.

In addition, it is preferable in the present inventive process to dispose a porous substrate in a reaction vessel so that a surface of said substrate on which a membrane is formed becomes perpendicular. The expression "dispose the substrate perpendicularly" means that the substrate is disposed in a reaction vessel in such a manner that the substrate surface on which the membrane is formed is placed perpendicularly to the ground. Thus, by performing hydrothermal synthesis with a porous substrate being disposed perpendicularly in a reaction vessel, a crystallized MOR zeolite membrane dominantly oriented along the b-axis or the c-axis may be produced. In the case that a porous substrate is disposed in a reaction vessel so that a surface of the substrate on which a membrane is formed becomes horizontal to the ground, one may obtain an MOR zeolite membrane having only a lower layer being oriented in a specific crystalline direction, with the upper layer not being oriented in the desired manner.

Incidentally, a so-called seeding step, in which a seed crystal is applied beforehand to facilitate crystallizing of the zeolite using hydrothermal synthesis is not required in producing an MOR zeolite membrane of the present invention. However, it is preferable to perform a seeding step because a dense zeolite membrane may be obtained, and as a consequence, a membrane having a good separation performance may be obtained.

The present invention is hereinbelow described with reference to Examples and Comparative Examples in more detail. However, the present invention is not limited to the following discussion of the Examples and Comparative Examples.

Example 1

B-Axis Oriented MOR Zeolite Membrane 0.425 g of sodium aluminate was mixed with sodium hydroxide solution (7.26 gNaOH+28.8 gH$_2$O) to give a mixture, and the mixture was sufficiently stirred at room temperature (20° C.). 72 g of colloidal silica (30 wt % SiO$_2$+0.6 wt % Na$_2$O) was added to the resultant mixture, and was sufficiently mixed at 50° C. until a transparent solution was obtained. The resultant raw material gel had a molar ratio of 10Na$_2$O: 0.15Al$_2$O$_3$: 36SiO$_2$: 440H$_2$O.

The surface of a porous alumina tube (10 mm of outer diameter, 60 mm long) having a fine pore diameter of 0.1 μm was washed, and a commercial mordenite seed crystal (molar ratio: SiO$_2$/Al$_2$O$_3$=10.2) was applied on the surface of the substrate by a dip method. Then, the substrate was dried by 100° C. for 15 minutes. The prepared raw material gel solution was put in an autoclave, and the porous alumina tube was perpendicularly sunk in the gel, aided by the use of a Teflon support stand. Then, the autoclave was closed and hydrothermal synthesis was performed at 180° C. for 5 hours. After being cooled, the porous alumina tube was taken out of the gel raw material, and a membrane formed on the surface thereof was sufficiently washed with distilled water. Then, the resultant product was dried at 100° C.

Figure 1B:
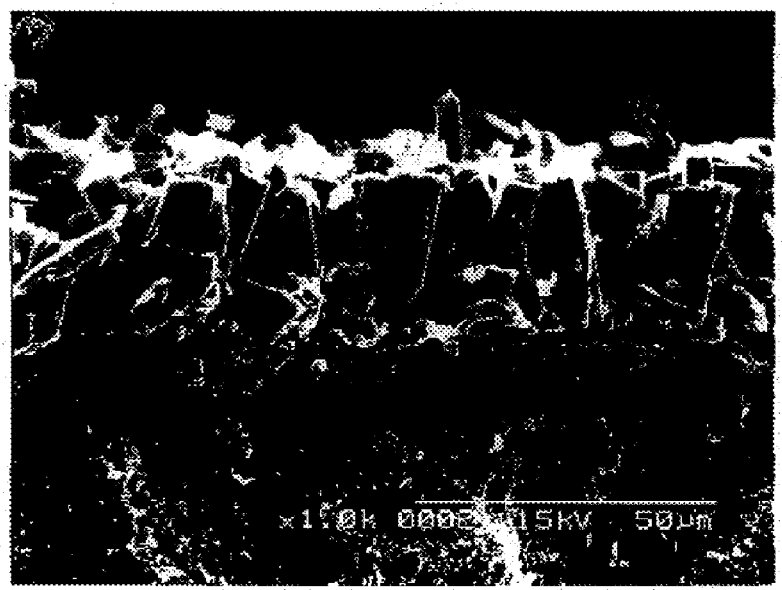
FIG. 1(b) is an SEM photograph showing a crystal structure of a cross-section of the membrane obtained in Example 1.

The membrane formed on the substrate was subjected to X-ray diffraction and SEM observation of a cross-section and a surface, and it was confirmed that the membrane was a mordenite (MOR) zeolite membrane having crystals dominantly oriented along the b-axis. FIG. 1(a) is an SEM photograph showing a crystal structure of a surface of the membrane, and FIG. 1(b) is an SEM photograph showing a crystal structure of a cross-section of the membrane.

Comparative Example 1

The same mixtures and procedures performed in Example 1 were repeated except that the hydrothermal synthesis reaction was performed at 100° C. for 2 weeks. After being cooled, the porous alumina tube was taken out of the raw material, and a membrane formed on the surface of the substrate was sufficiently washed with distilled water. Then, the resultant product was dried at 100° C.

The membrane formed on the substrate was subjected to X-ray diffraction and SEM observation of a cross-section and a surface, in which no X-ray diffraction peaks of any crystals were recognized. Accordingly, the membrane was confirmed to be amorphous.

Example 2

C-Axis Oriented MOR Zeolite Membrane 3.7045 g of aluminum sulfuric anhydride was sufficiently mixed with sodium hydroxide solution (12.595 g NaOH+40 g H$_2$O) at room temperature to obtain a solution. A mixture of 80 g of colloidal silica and 192 g of water was sufficiently mixed with the above-obtained solution for 1 hour. The formed raw material gel had a molar ratio of 0.38Na$_2$O: 0.025Al$_2$O$_3$: SiO$_2$:40H$_2$O.

The surface of a porous alumina tube (10 mm of outer diameter, 60 mm long) having a fine pore diameter of 0.1 μm was washed, and a commercial mordenite seed crystal (molar ratio: SiO$_2$/Al$_2$O$_3$=10.2) was applied on the surface by a slurry coat method. Then, the tube was dried at 100° C. for 15 minutes. The above gel was put in an autoclave, and the porous alumina tube was sunk in the gel, aided by the use of a Teflon support stand. The autoclave was closed, and hydrothermal synthesis was performed at 180° C. for 5 hours. After being cooled, the porous alumina tube was taken out, and a membrane formed on the surface was sufficiently washed with distilled water. Then, the resultant product was dried by 100° C.

Figure 2A:
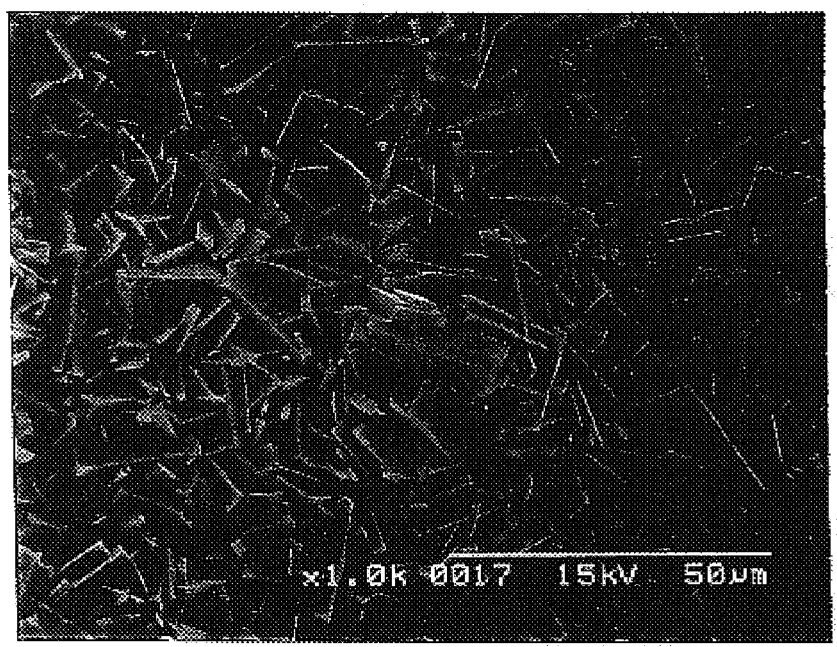
FIG. 2(a) is an SEM photograph showing a crystal structure of a surface of the membrane.
Figure 2B:
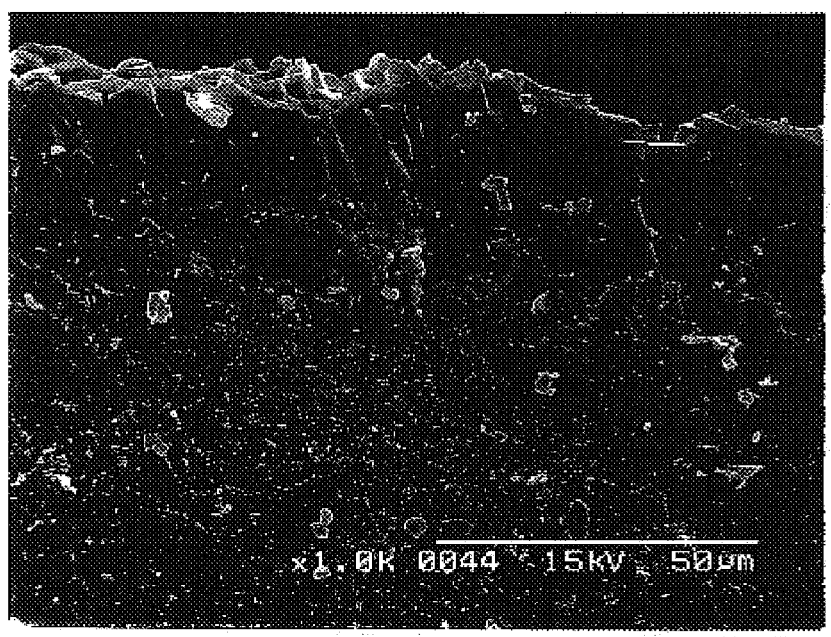
FIG. 2(b) is an SEM photograph showing a crystal structure of a cross-section of the membrane obtained in Example 2.

The membrane formed on the substrate tube was subjected to X-ray diffraction and SEM observation of a cross-section and a surface, and it was confirmed that the membrane was a mordenite (MOR) zeolite membrane dominantly oriented along the c-axis which was oriented in parallel with a substrate of the porous alumina tube. FIG. 2(a) is an SEM photograph showing a crystal structure of a surface of the membrane, and FIG. 2(b) is an SEM photograph showing a crystal structure of a cross-section of the membrane.

Comparative Example 2

2.277 g of aluminum sulfuric anhydrite was sufficiently mixed with sodium hydroxide solution (0.23 g NaOH+6 g H$_2$O) at room temperature to a solution. 20 g of colloidal silica was sufficiently mixed with the solution for 2 hours. The formed raw material gel had a molar ratio of 3Na$_2$O: Al$_2$O$_3$: 20Si$_2$O: 200H$_2$O.

The surface of a porous alumina tube (a diameter of 10 mm, 60 mm long) having a fine pore diameter of 0.1 μm was washed, and a commercial mordenite seed crystal (molar ratio:SiO$_2$/Al$_2$O$_3$=10.2) was applied on the surface by a slurry coat method. Then, the tube was dried at 100° C. for 15 minutes. The above gel solution was put in an autoclave, and the porous alumina tube was sunk perpendicularly into the gel, aided by the use of a Teflon support stand. The autoclave was closed, and hydrothermal synthesis was performed at 180° C. for 5 hours. After being cooled, the porous alumina tube was taken out, and a membrane formed on the surface was sufficiently washed with distilled water. Then, the resultant product was dried at 100° C.

The membrane formed on the substrate was subjected to X-ray diffraction and SEM observation of a cross-section and a surface, in which no X-ray diffraction peaks of any crystal was recognized, and the membrane was confirmed to be amorphous.

Comparative Example 3

1.129 g of aluminum sulfuric anhydride were sufficiently mixed with sodium hydroxide solution (3.84 g NaOH+78 g $H_2O$) at room temperature to obtain a solution. 20 g of colloidal silica was sufficiently mixed with the resultant solution for 1 hour. The formed raw materials gel had a molar ratio of $0.48Na_2O: 0.033Al_2O_3: SiO_2: 50H_2O$.

The surface of a porous alumina tube (10 mm of outer diameter, 60 mm long) having a fine pore diameter of 0.1 μm was washed, and a commercial mordenite seed crystal (molar ratio: $SiO_2/Al_2O_3=10.2$) was applied on the surface by a slurry coat method. Then, the tube was dried at 100° C. for 15 minutes. The above gel solution was put in an autoclave, and a porous alumina tube was sunk perpendicularly in the gel, aided by the use of a Teflon support stand. The autoclave was closed, and hydrothermal synthesis was performed at 180° C. for 5 hours. After being cooled, the porous alumina tube was taken out, and a membrane formed on the surface was sufficiently washed with distilled water. Then, the resultant product was dried at 100° C.

The membrane formed on the substrate was subjected to X-ray diffraction and SEM observation of a cross-section and a surface, in which no X-ray diffraction peaks of any crystal was recognized, and the membrane was confirmed to be amorphous.

Example 3

C-Axis Oriented MOR Zeolite Membrane

A raw material was prepared and hydrothermal synthesis was performed in the same manner as in Example 2 except that a raw-material gel had a molar ratio of $0.28Na_2O: 0.0042Al_2O_3: SiO_2: 12.2H_2O$ and that a hydrothermal synthesis was performed at 180° C. for 2 days.

Figure 3:
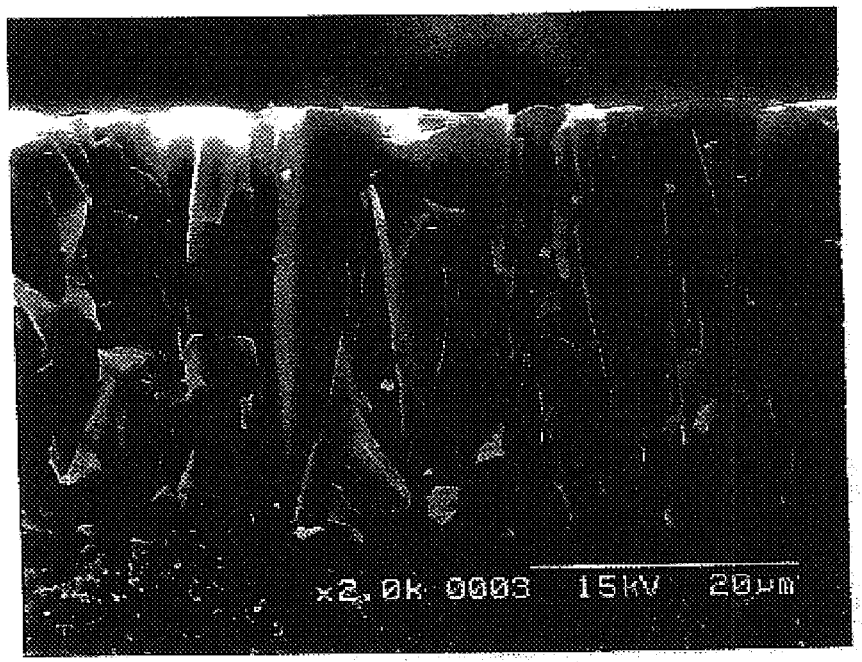
FIG. 3 is an SEM photograph showing a crystal structure of a cross-section of the membrane obtained in Example 3.
Figure 4:
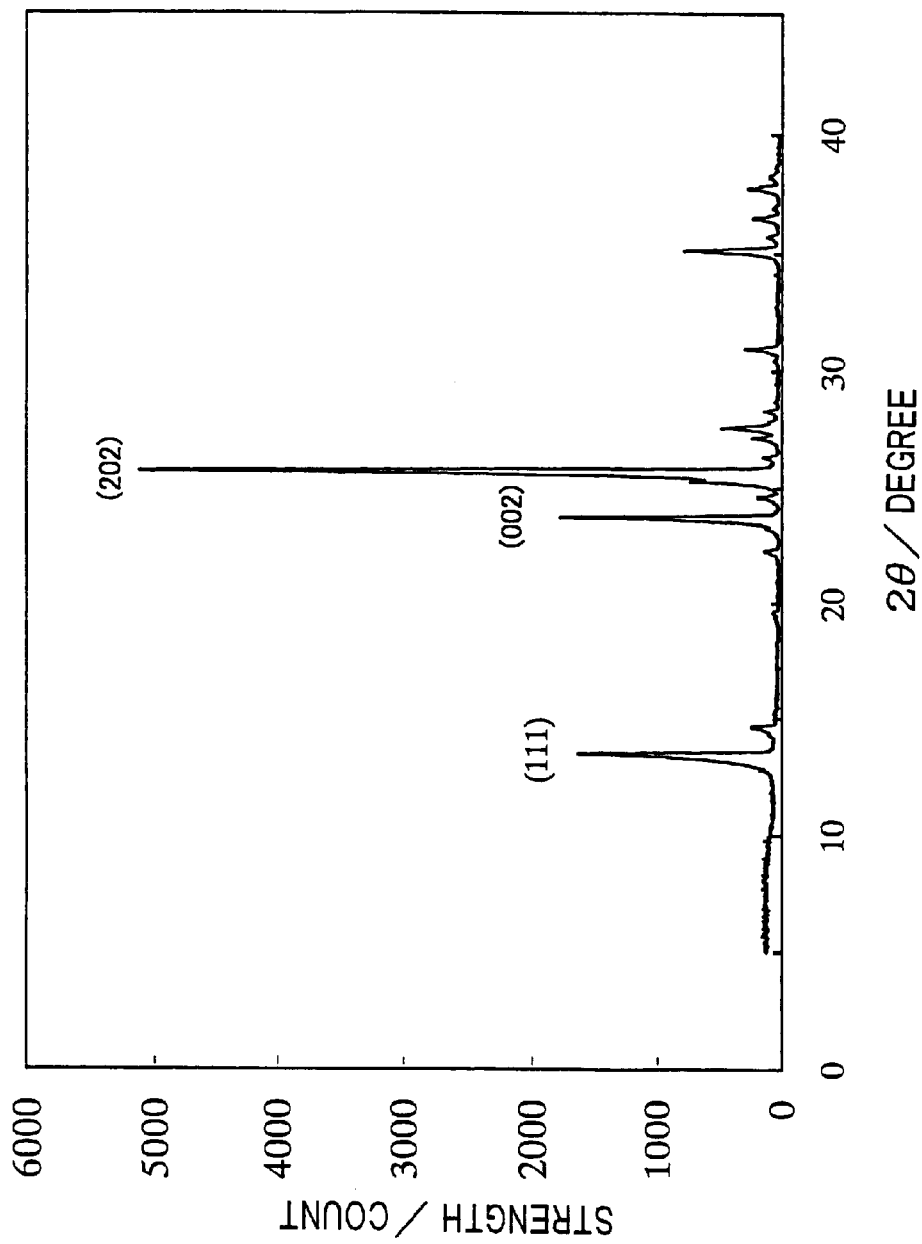
FIG. 4 is a graph showing an X-ray diffraction pattern of the membrane obtained in Example 3.

The membrane formed on the substrate was subjected to X-ray diffraction and SEM observation of a cross-section and a surface, and it was confirmed that the membrane was a mordenite (MOR) zeolite membrane dominantly oriented along the c-axis which was oriented in parallel with a substrate of the porous alumina tube. FIG. 3 is an SEM photograph showing a crystal structure of a cross-section of the membrane, and FIG. 4 is a graph showing an X-ray diffraction pattern.

Comparative Example 4

A raw material was prepared and hydrothermal synthesis was performed in the same manner as in Example 3 except that hydrothermal synthesis was performed at 100° C.

The membrane formed on the substrate was subjected to X-ray diffraction and SEM observation of a cross-section and a surface, and it was confirmed that the membrane was not oriented in a specific crystalline direction but had random orientation, although crystallization was recognized.

Comparative Example 5

A raw material was prepared and hydrothermal synthesis was performed in the same manner as in Example 3 except that hydrothermal synthesis was performed at 140° C.

The membrane formed on the substrate was subjected to X-ray diffraction and SEM observation of a cross-section and a surface, and it was confirmed that the membrane was not oriented in a specific crystalline direction but had random orientation, although crystallization was recognized.

Comparative Example 6

A raw material was prepared and hydrothermal synthesis was performed in the same manner as in Example 2 except that a raw material gel had a molar ratio of $0.15Na_2O: 0.05Al_2O_3: SiO_2: 10H_2O$. After being cooled, the porous alumina tube was taken out of the reaction vessel, and it was discovered that no membrane was formed on the porous alumina tube.

Example 4

A raw material was prepared and hydrothermal synthesis was performed in the same manner as in Example 3 except that porous alumina tube was sunk horizontally in an autoclave and that hydrothermal synthesis was performed at 180° C. for 24 hours.

Figure 5:
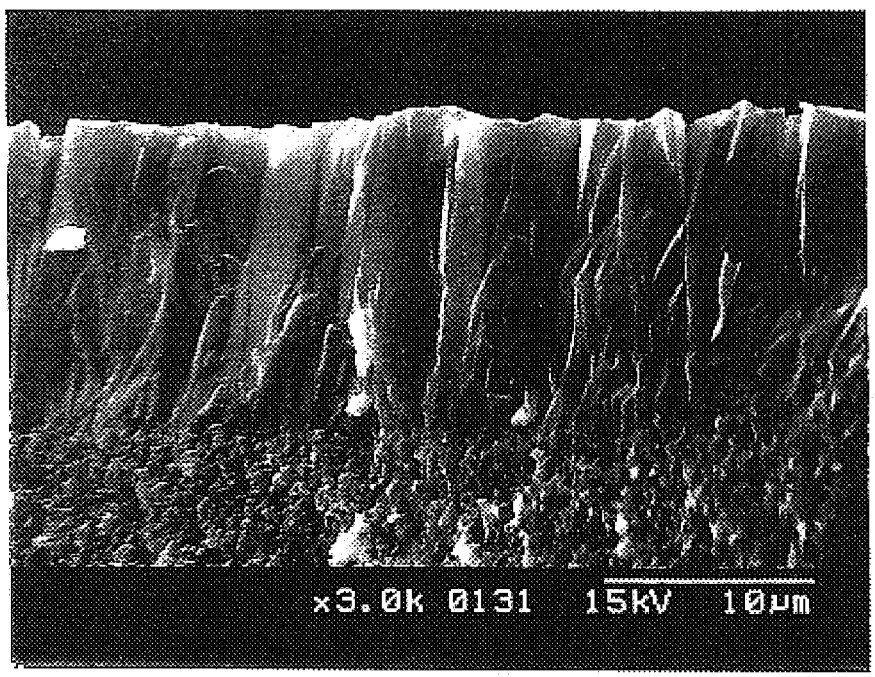
FIG. 5 is an SEM photograph showing a crystal structure of a cross-section of the membrane obtained in example 4.

The membrane formed on the substrate was subjected to X-ray diffraction and SEM observation of a cross-section and a surface, and it was confirmed that a membrane was not oriented in a specific crystalline direction in a layer on the upper side, but was dominantly oriented along c-axis crystalline direction only in a layer on the lower side which was near the porous alumina tube substrate side. FIG. 5 is an SEM photograph showing a crystal structure of a cross-section of the membrane.

As discussed above, according to the present invention, there can be provided an MOR zeolite membrane oriented in a specific crystalline direction and a preferable method for producing the membrane.

What is claimed is:

1. A method for producing a mordenite (MOR) zeolite membrane on a porous substrate, comprising the steps of:
   immersing the porous substrate in a gel of raw material comprising zeolite constitution elements in molar ratios of 40–400 of $SiO_2/Al_2O_3$, 10–120 of $H_2O/Na_2O$, and 10–40 of $H_2O/SiO_2$; and
   subjecting the gel in the presence of the porous substrate to hydrothermal synthesis at 150° C. or more to crystallize said zeolite constitution elements and form a mordenite zeolite membrane on the porous substrate, wherein
   said mordenite zeolite membrane has crystals substantially oriented in a specific crystalline direction.

2. A method as defined in claim 1, wherein a surface of the porous substrate on which the mordenite zeolite membrane is formed is disposed in a reaction vessel perpendicular to the reaction vessel.

3. A method as defined in claim 1, wherein the molar ratio of $SiO_2/Al_2O_3$ is 100–400, the molar ratio of $H_2O/Na_2O$ is 10–100, and the molar ratio of $H_2O/SiO_2$ is 10–30.

4. A method as defined in claim 2, wherein the molar ratio of $SiO_2/Al_2O_3$ is 100–400, the molar ratio of $H_2O/Na_2O$ is 10–100, and the molar ratio of $H_2O/SiO_2$ is 10–30.

5. A method as defined in claim 1, wherein said membrane is formed directly on said substrate.

* * * * *